United States Patent
Bharadwaj et al.

(10) Patent No.: US 10,546,313 B2
(45) Date of Patent: Jan. 28, 2020

(54) DETERMINING SENSOR PLACEMENT AND A REWARD SHARING MECHANISM BASED ON SHARED ENERGY FORECASTING INFORMATION

(71) Applicant: International Business Machines Corporation, Armonk, NY (US)

(72) Inventors: Samarth Bharadwaj, Bangalore (IN); Pankaj Dayama, Bangalore (IN); Shivkumar Kalyanaraman, Bangalore (IN); Pratyush Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 15/232,044

(22) Filed: Aug. 9, 2016

(65) Prior Publication Data

US 2018/0047043 A1 Feb. 15, 2018

(51) Int. Cl.
*G06Q 30/02* (2012.01)
*G01W 1/00* (2006.01)
*G06Q 50/06* (2012.01)

(52) U.S. Cl.
CPC .......... *G06Q 30/0217* (2013.01); *G01W 1/00* (2013.01); *G06Q 50/06* (2013.01)

(58) Field of Classification Search
None
See application file for complete search history.

(56) References Cited

U.S. PATENT DOCUMENTS 7,948,400 B2   5/2011 Horvitz et al.
10,169,771 B1 * 1/2019 Devereaux ......... G06Q 30/0215
(Continued)

FOREIGN PATENT DOCUMENTS

WO   WO 2010/140090 A1 * 12/2010 ............. G05B 15/02
WO   WO 2011/121535 A2 * 10/2011 ................ H02J 3/14
(Continued)

OTHER PUBLICATIONS

Advanced Metering Initiatives and Residential Feedback Programs: A Meta-Review for Household Electricity-Saving Opportunities, Erhardt-Martinez et al., American Council for an Energy-Efficient Economy, Jun. 2010.*
(Continued)

*Primary Examiner* — David J Stoltenberg
(74) *Attorney, Agent, or Firm* — Ryan, Mason & Lewis, LLP

(57) ABSTRACT

Methods, systems, and computer program products for determining sensor placement and a reward sharing mechanism based on shared energy forecasting information are provided herein. A computer-implemented method includes processing multiple data streams derived from multiple respective energy-related sensors within a network, wherein each of the multiple energy-related sensors is linked to a respective one of multiple spatially distributed prosumers of the network; computing an expected utility, with respect to forecast accuracy of energy production within the network, of information captured by each of the multiple energy-related sensors based on said processing; determining a reward structure for each of the prosumers of the network based on the expected utility of the information captured by the energy-related sensors linked to each of the prosumers; and outputting a reward to each of the prosumers of the network in accordance with the determined reward structure.

15 Claims, 5 Drawing Sheets

(56) References Cited

U.S. PATENT DOCUMENTS

| | | | | |
|---|---|---|---|---|
| 2002/0178047 A1* | 11/2002 | Or | | G06Q 10/04 705/412 |
| 2004/0024483 A1* | 2/2004 | Holcombe | | G06Q 30/02 700/122 |
| 2004/0103139 A1* | 5/2004 | Hubbard | | G06Q 30/0212 709/201 |
| 2004/0260490 A1* | 12/2004 | Matsubayashi | | H02J 13/0062 702/60 |
| 2005/0171645 A1* | 8/2005 | Oswald | | G05B 15/02 700/276 |
| 2007/0239317 A1* | 10/2007 | Bogolea | | B60H 1/0065 700/276 |
| 2008/0126108 A1 | 5/2008 | Hodgin | | |
| 2009/0195349 A1* | 8/2009 | Frader-Thompson | | G01D 4/002 340/3.1 |
| 2009/0227876 A1* | 9/2009 | Tran | | A61B 5/0022 600/483 |
| 2010/0076615 A1* | 3/2010 | Daniel | | F03D 9/00 700/293 |
| 2010/0076835 A1* | 3/2010 | Silverman | | G06Q 10/06 705/14.33 |
| 2010/0262313 A1* | 10/2010 | Chambers | | G05B 15/02 700/295 |
| 2010/0286937 A1* | 11/2010 | Hedley | | G06Q 30/02 702/60 |
| 2010/0332373 A1* | 12/2010 | Crabtree | | G06Q 40/04 705/37 |
| 2011/0035060 A1* | 2/2011 | Oswald | | G05B 15/02 700/278 |
| 2011/0035073 A1* | 2/2011 | Ozog | | G06Q 10/06315 700/291 |
| 2011/0040785 A1* | 2/2011 | Steenberg | | G05B 23/0235 707/769 |
| 2011/0061014 A1* | 3/2011 | Frader-Thompson | | G01D 4/002 715/771 |
| 2011/0276288 A1* | 11/2011 | Hsieh | | F24D 19/1009 702/60 |
| 2012/0203386 A1* | 8/2012 | Fakos | | G05B 15/02 700/291 |
| 2012/0215369 A1* | 8/2012 | Desai | | G06Q 10/06 700/291 |
| 2012/0324119 A1* | 12/2012 | Imes | | F24F 11/63 709/227 |
| 2013/0253969 A1 | 9/2013 | Das et al. | | |
| 2013/0345993 A1* | 12/2013 | Bellala | | G01F 15/063 702/45 |
| 2014/0006329 A1* | 1/2014 | Hu | | G06Q 50/06 706/46 |
| 2014/0052303 A1* | 2/2014 | Venkatakrishnan | | G06F 1/3203 700/291 |
| 2014/0100912 A1* | 4/2014 | Bursey | | H04W 4/70 705/7.27 |
| 2014/0297206 A1* | 10/2014 | Silverman | | G01R 22/063 702/58 |
| 2015/0026316 A1* | 1/2015 | Imes | | F24F 11/63 709/220 |
| 2015/0051749 A1* | 2/2015 | Hancock | | G06Q 50/06 700/295 |
| 2015/0094968 A1* | 4/2015 | Jia | | G06Q 40/04 702/60 |
| 2015/0227148 A1* | 8/2015 | Tanaka | | G06Q 10/063 700/291 |
| 2015/0316594 A1* | 11/2015 | Kania | | G01R 21/133 702/62 |
| 2016/0117657 A1* | 4/2016 | Forbes, Jr. | | G06Q 20/145 705/7.31 |
| 2016/0209822 A1* | 7/2016 | Pulliam | | G06Q 10/04 |
| 2016/0210680 A1* | 7/2016 | Pulliam | | G06Q 10/04 |
| 2016/0212506 A1* | 7/2016 | Norwood | | H04Q 9/00 |
| 2016/0260135 A1* | 9/2016 | Zomet | | H04L 12/2812 |
| 2016/0283958 A1* | 9/2016 | Devereaux | | G06Q 30/0209 |
| 2016/0335731 A1* | 11/2016 | Hall | | G06Q 50/163 |
| 2016/0343094 A1* | 11/2016 | Forbes, Jr. | | G05D 17/00 |
| 2016/0370818 A1* | 12/2016 | Kopp | | G05F 1/66 |
| 2016/0371289 A1* | 12/2016 | Kopp | | G05F 1/66 |
| 2017/0006135 A1* | 1/2017 | Siebel | | H04L 67/02 |
| 2017/0054296 A1* | 2/2017 | Daniel | | H02J 1/14 |
| 2017/0083989 A1* | 3/2017 | Brockman | | G06Q 50/06 |
| 2017/0091867 A1* | 3/2017 | Trainor | | G06Q 40/08 |
| 2017/0285081 A1* | 10/2017 | Silverman | | G01R 22/063 |
| 2017/0329290 A1* | 11/2017 | Kopp | | G06Q 10/06312 |
| 2017/0338693 A1* | 11/2017 | Forbes, Jr. | | G05B 19/02 |
| 2017/0364112 A1* | 12/2017 | Templeton | | G05F 1/66 |
| 2018/0047043 A1* | 2/2018 | Bharadwaj | | G01W 1/00 |
| 2018/0048484 A1* | 2/2018 | Gelonese | | H04L 12/283 |
| 2018/0204293 A1* | 7/2018 | Bazhinov | | H02B 1/056 |
| 2019/0075166 A1* | 3/2019 | Gandhi | | H04L 67/125 |
| 2019/0171245 A1* | 6/2019 | Kopp | | G05F 1/66 |

FOREIGN PATENT DOCUMENTS

| | | | | |
|---|---|---|---|---|
| WO | WO 2014/016092 A2 * | 1/2014 | | H02J 3/14 |
| WO | WO 2018/098562 A1 * | 6/2018 | | G06Q 10/04 |
| WO | WO 2018/148732 A2 * | 8/2018 | | G06Q 30/02 |

OTHER PUBLICATIONS

Smart Grid: Overview, Issues and Opportunities. Advances and Challenges in Sensing, Modeling, Simulation, Optimization and Control, S. Massoud Amin, European Journal of Control (2011)5-6:547-567.*

User Activity Recognition for Energy Saving in Smart Home Environment; Lima et al., 20th IEEE Symposium on Computers and Communication (ISCC), 2015.*

U.S. Appl. No. 15/172,566, filed Jun. 3, 2016, entitled, "Cloud Coverage Estimation by Dynamic Scheduling of a Distributed Set of Cameras."

* cited by examiner

DETERMINING SENSOR PLACEMENT AND A REWARD SHARING MECHANISM BASED ON SHARED ENERGY FORECASTING INFORMATION

FIELD

The present application generally relates to information technology, and, more particularly, to energy forecasting technology.

BACKGROUND

Existing approaches for energy forecasting can include the use of weather stations and/or localized sensors to obtain weather information. The use of weather stations captures a large spectral band of information, but does so at a low spatial and temporal resolution. Also, the use of localized sensors captures information that is specific to the given location, but is expensive to gather, process, and analyze.

SUMMARY

In one embodiment of the present invention, techniques for determining sensor placement and a reward sharing mechanism based on shared energy forecasting information are provided. An exemplary computer-implemented method can include steps of processing multiple data streams derived from multiple respective energy-related sensors within a network, wherein each of the multiple energy-related sensors is linked to a respective one of multiple spatially distributed prosumers of the network; computing an expected utility, with respect to forecast accuracy of energy production within the network, of information captured by each of the multiple energy-related sensors based on said processing; determining a reward structure for each of the prosumers of the network based on the expected utility of the information captured by the energy-related sensors linked to each of the prosumers; and outputting a reward to each of the prosumers of the network in accordance with the determined reward structure.

In another embodiment of the invention, an exemplary computer-implemented method can additionally include determining a recommendation for installation of one or more additional energy-related sensors within the network based on (i) the location of the multiple energy-related sensors, (ii) the location of the prosumers within the network, and (iii) the expected utility of the information captured by the energy-related sensors. Such a method can also include generating a cost-sharing scheme applicable to the prosumers of the network for the installation of the one or more additional energy-related sensors based on an expected derived value of the one or more additional energy-related sensors to the prosumers, and outputting, to the prosumers of the network, (i) the recommendation and (ii) the cost-sharing scheme.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
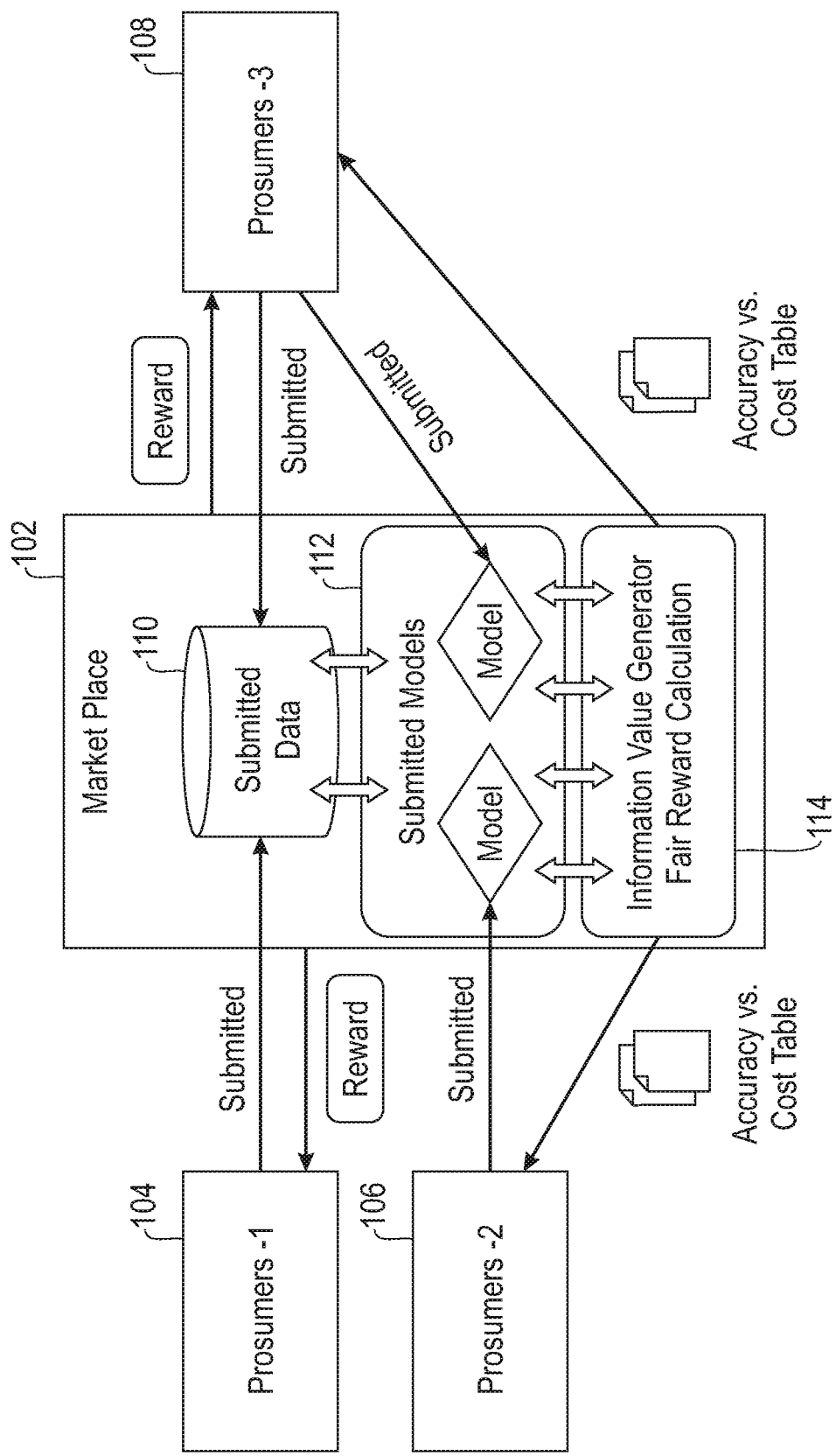
FIG. 1 is a diagram illustrating system architecture, according to an exemplary embodiment of the invention.

As described herein, an embodiment of the present invention includes recommending sensor placement, fair costs, and a reward sharing mechanism based on values of shared information for energy forecasting. At least one embodiment of the invention includes generating multiple data streams derived from heterogeneous sensors positioned in conjunction with each of multiple prosumers. As used herein, a "prosumer" refers to an individual/entity that is both a consumer and producer of energy. Such data streams include different types of data (energy flow, weather phenomena, etc.) at different temporal and spatial resolutions and accuracies. Additionally, in one or more embodiments of the invention, such data streams are transmitted to a centralized system. By way merely of example, consider a use case scenario involving electric vehicles as prosumers. In such an example scenario, electric vehicles can represent prosumers which use energy services in various locations (such as charging points) and in varying quantities. The owners/operators of such vehicles can also sell energy stored in the car battery back into the grid.

At least one embodiment of the invention can also include blending data from the different data streams to forecast energy production of each (participating) prosumer, and analyzing the expected utility of information gathered by each of the sensors. Further, such an embodiment can include computing and/or determining a (fair) reward structure for each participating prosumer based on the value of information contributed via the sensor(s) operated and/or linked to each participating prosumer (through the centralized system).

One or more embodiments of the invention can additionally include periodically recommending different heterogeneous sensors to be installed within the network linking the participating prosumers. Such an embodiment can also include recommending a geo-location for each recommended sensor installation. As further detailed herein, such recommendations are generated and output to improve energy forecast accuracy of the spatially distributed prosumers while ensuring a fair cost-sharing mechanism amongst the prosumers. Such a cost-sharing mechanism can include sharing the cost of the added infrastructure amongst the prosumers based on the expected derived value to each prosumer. While prosumers are commonly interested in energy/weather forecasting at their respective locations, prosumers are also commonly interested in sharing the data captured by their respective sensors. Accordingly, the value of information to a given prosumer can be based, for example, on the total improvement in the forecasting accuracy of all other prosumers that can be significantly attributed to the data that the given prosumer provided.

The techniques described herein include leveraging an existing sensor infrastructure of prosumers, wherein such sensors measure diverse variables locally for the prosumers. The measurements obtained from such sensors can be heterogeneous in nature, varying in resolution, accuracy and data type. The sensors can be categorized, for example, into a category of power sensors (smart meters, cycle computers, etc.) and a category of environmental sensors (cameras, anemometers, light meters, etc.). Further, one or more embodiments of the invention can also include utilizing production measurements from renewable energy assets. For example, in the case of a roof-top solar photovoltaic (PV) system, the amount of energy generated will be proportional to the irradiance falling on the panel. As such, the measurements from the renewable energy assets can provide a sense of the inputs to the system.

FIG. 1 is a diagram illustrating system architecture, according to an embodiment of the invention. By way of illustration, FIG. 1 depicts a data-and-model marketplace framework that includes prosumers 104, 106 and 108, and a marketplace component 102, which includes a database of submitted data 110, a collection of submitted models 112, and an information value generator component 114 to calculate fair reward mechanisms. The marketplace component 102 can include, for example, a software system which will ask prosumers to upload data and/or model information, as well as fairly reward the prosumers based on the usefulness of their data for accuracy improvement of models of other prosumers.

As illustrated in FIG. 1, the marketplace component 102 receives input from prosumers 104, 106 and 108 in the form of data (derived from sensors associated with the prosumers and stored in component 110) and/or one or more models 112 for evaluation. Models 112 can be used, for example, for energy forecasting for a prosumer. For instance, a model can include a multi-variate time series model which takes, as input, data provided by a subset of spatially distributed prosumers, and uses such data to generate an energy forecast. In at least one embodiment of the invention, each prosumer has his/her own model.

Subsequently, the information value generator component 114 combines and/or blends the various submitted data sets, and evaluates the performance of each submitted model to generate an output (a table, for example) that represents an accuracy versus cost comparison for each model. As such, each participating prosumer (104, 106, and 108) can receive such an output and determine the suitability of the noted trade-off, whereby the determined suitability can be used to determine a pricing mechanism among the prosumers for sharing data and/or implementing additional sensors. Relatedly, each prosumer can be (fairly) rewarded for the marginal value of the data provided by that prosumer. Such rewards can include, for example, monetary rewards to the prosumers. In one or more example embodiments of the invention, a prosumer can invest in buying sensors and recording values, and if other prosumers find the resulting data useful in improving their forecast accuracy, the marketplace will charge those other prosumers some amount of money and make appropriate payment to the investing prosumer.

Figure 2:
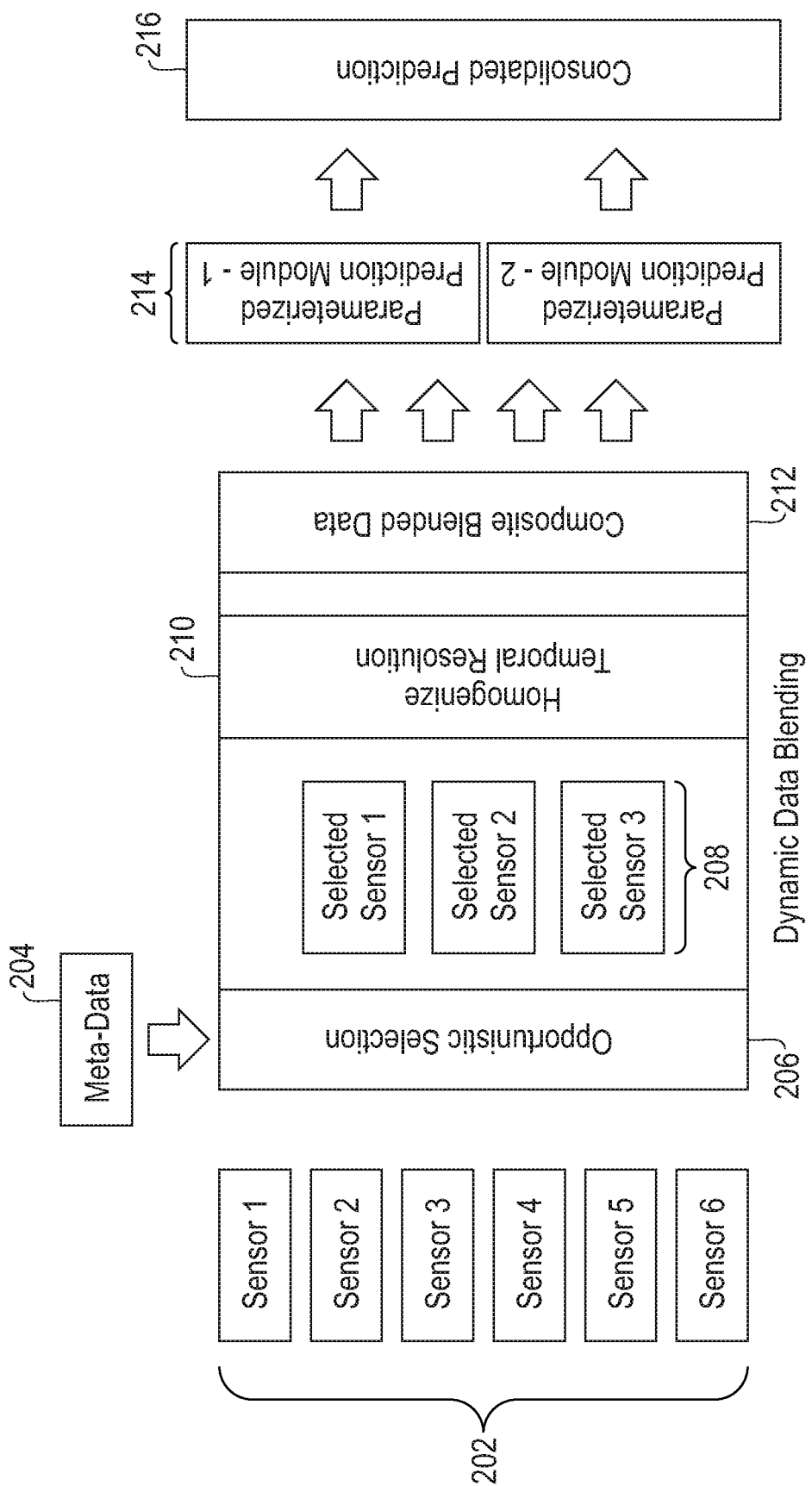
FIG. 2 is a diagram illustrating system architecture, according to an exemplary embodiment of the invention.

FIG. 2 is a diagram illustrating system architecture, according to an embodiment of the invention. By way of illustration, FIG. 2 depicts system architecture for blending data provided by the prosumers. The illustrated architecture includes a collection of sensors 202 and a dynamic data blending system that includes an opportunistic selection component 206, a set of selected sensors 208, a temporal resolution homogenization component 210, and a blended data composition component 212.

As illustrated in FIG. 2, from the available heterogeneous sensors 202, the appropriate set of sensor output is chosen by selection component 206 based on metadata 204 pertaining to a region of interest such as, for example, proximity, accuracy, time of day, etc. Data from the selected sensors 208 are homogenized via component 210 to a constant temporal resolution and blended via component 212 to generate a composite representation of the data. By way merely of example, assume that there are two sensors: the first sensor recording data every hour and the second sensor recording data every six hours. Accordingly, via a homogenization step, at least one embodiment of the invention can include converting the data from the first sensor to six-hour resolution by taking an average value of six readings. Additionally, via a blending step, such an embodiment of the invention can include saving data from both sensors together with appropriate time stamps.

Based on the composite representation of the data, parameterized prediction modules 214 generate a consolidated prediction 216. Each parameterized module 214 can take a subset of blended data and use the subset for energy prediction. A consolidated prediction 216 can be obtained, for example, by combining the predictions from multiple parameterized modules 214. By way of example, a consolidated prediction can include taking the average of predictions from multiple parameterized prediction modules.

As also detailed herein, one or more embodiments of the invention can include generating and/or implementing a monetization mechanism based on the calculated value of sensor information. Based on inputs including data streams provided by different prosumers, along with application programming interfaces (APIs) for an energy forecasting module, such an embodiment can include outputting a calculated payment amount, wherein such a payment is to be made to a particular prosumer based on the value of the sensor information shared by that prosumer among other participating prosumers.

Carrying out such a transformation can include, for example, the following steps. By way of illustration, let $M_i$ and/or $D_i$ represent the forecasting model and data provided by user i to the marketplace, respectively. Additionally, let $X=(D_1, D_2, \ldots, D_n)$ represent the overall data submitted to the marketplace, wherein $D_i=(X_{i1}, X_{i2}, \ldots X_{im})$ represent the m streams of data provided by prosumer i. Note also that prosumers can submit APIs (or .exe files) to run a forecasting model and specify the desired data streams (minimal, maximal) to run the model. Additionally, assume that prosumer i gets a base accuracy of $B_i$ from a model using data $D_i$. Further, for each user i, the marketplace selects fields from data provided by other users such that accuracy improvement (for each user) is above a certain threshold $T_i$. Also, let $S_i$ be the set selected for user I, and for each element x in $S_i$, the marginal value of x to user i is calculated as f(Forecast Accuracy with $D_i \cup S_i$—forecast accuracy using data $D_i \cup S_i \backslash x$). Additionally, the net value of each prosumer (say $V_i$) is determined, and the payment (made by/to) prosumer i is calculated as proportional to $V_i$.

As also detailed herein, one or more embodiments of the invention include determining and outputting periodic recommendations for sensor placement and a (fair) cost sharing mechanism related thereto. Inputs utilized in such an embodiment can include the current location of all sensors provided by the participating prosumers and/or weather stations, the current location of all participating prosumers, the current forecast accuracy for all participating prosumers (provided by data blending at a centralized marketplace, for example), as well as the identification of new prosumers added to the network/system. Based on such inputs, at least one embodiment can determine and output a location for placing or installing one or more new sensors, as well as the calculated contribution from each prosumer to buy and/or maintain the new sensor(s).

Carrying out such a transformation can include, for example, the following steps. Based on the forecast accuracy and identification of new prosumers, one or more embodiments of the invention can include identifying "q" potential spatial locations for placing and/or installing one or more new sensors. By way of illustration, let $T=\{t_1, t_2, \ldots, t_k\}$ represent k types of sensors (for example, camera1, camera2, temperature, wind) and $L=\{L_1, L_2, \ldots, L_q\}$ represent q different locations. Also, let $S=\{S_1, S_2, \ldots, S_m\}$ represent the set of feasible allocations of sensors to locations, let $U(S_i)$ represent the overall utility of allocation $S_i$ to all participating prosumers, and let $C(S_i)$ represent the cost. Further, in such an embodiment, let $S^*$ represent the optimal allocation which maximizes the (utility—cost) for this allocation, wherein $C(S^*)$ is shared by the participating prosumers in proportion to their derived utility.

Figure 3:
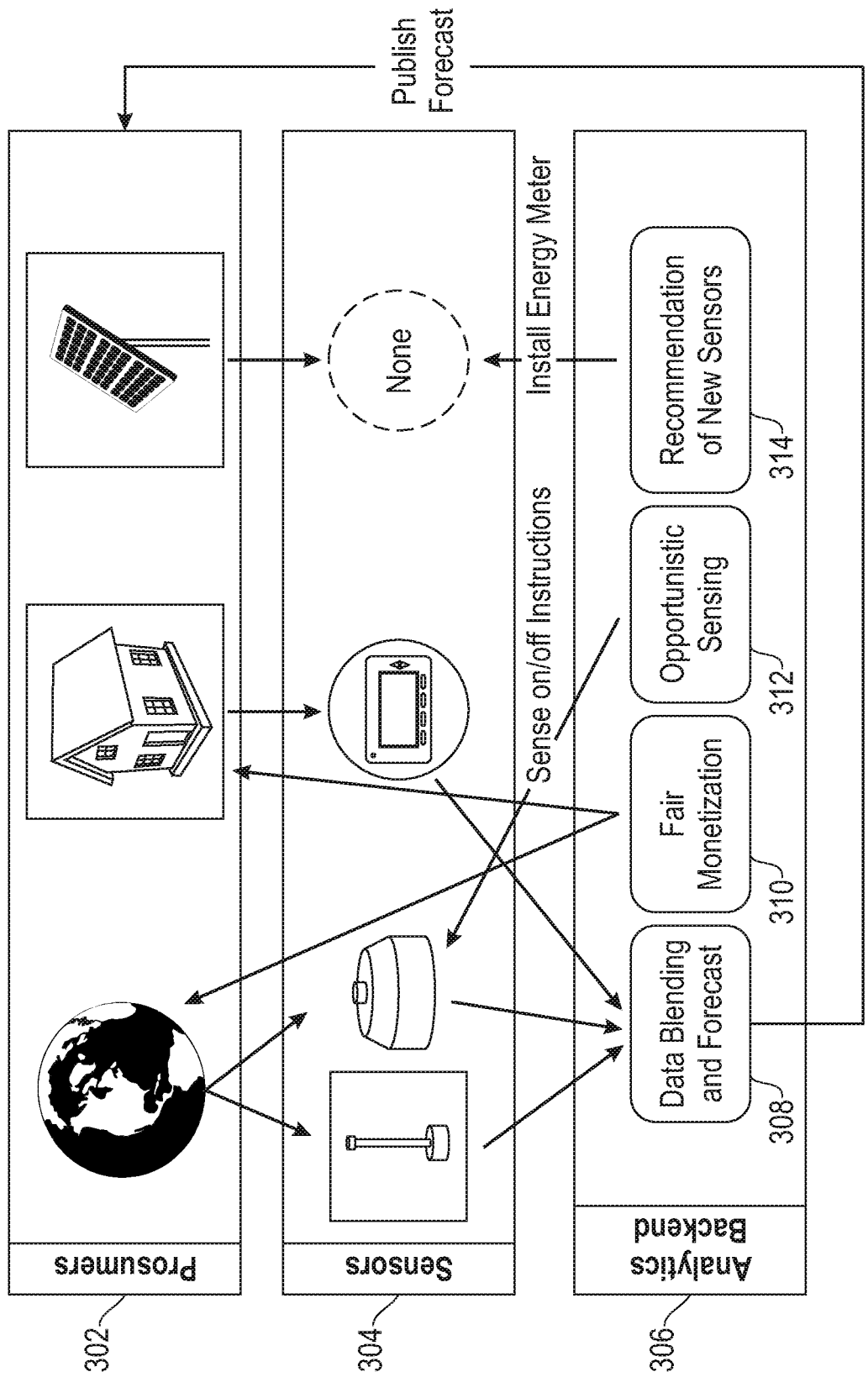
FIG. 3 is a diagram illustrating system architecture, according to an exemplary embodiment of the invention.

FIG. 3 is a diagram illustrating system architecture, according to an embodiment of the invention. By way of illustration, FIG. 3 depicts prosumers 302, sensors 304, and an analytics backend system 306 that includes a data blending and forecasting component 308, a fair monetization component 310, an opportunistic sensing component 312, and a new sensor recommendation component 314.

Specifically, an embodiment such as depicted in FIG. 3 includes the generation of multiple data streams via heterogeneous sensors 304 positioned and/or installed at each of multiple participating prosumers 302 to sense different types of data (energy flow, weather phenomena, etc.) at different temporal and spatial resolutions and accuracies. Transmission and collection of data streams produced by the sensors at each prosumer can be carried out via a centralized information management system, such as system 306 depicted in FIG. 3.

Such a system 306, as noted above, can include an analytics engine 308 for intelligent data-blending of the different data streams to forecast energy production of each prosumer (which can then be output to the prosumers). Additionally, system 306 can include an analytics engine 312 that determines and/or decides the instances of operation of the sensors 304 based on a computed expected utility of information to be gathered by each of the sensors. Further, in one or more embodiments of the invention, a control mechanism can be implemented at each prosumer to regulate system operation based on the forecasted energy production. At least one embodiment of the invention can also include measuring and tracking the influence of the obstructions such as clouds, fog, wind systems, and/or other weather phenomenon based on the data obtained from the sensors 304. Such measurements and tracking information can be used, for example, by component 312 for determining instances of sensor operation, as well as by component 314 for determining potential deployments of new sensors that improves accuracy of prediction.

System 306, as additionally noted above, can also include a monetization framework 310 to compute a reward structure for each participating prosumer based on the value of information contributed by the sensors associated with each prosumer, which can be computed by a centralized hub or system. Further, system 306 also includes a recommendation engine 314 that suggest types, locations, and cost-sharing schemes of new sensors to be added (to the network of participating prosumers) for improving forecast accuracy.

Figure 4:
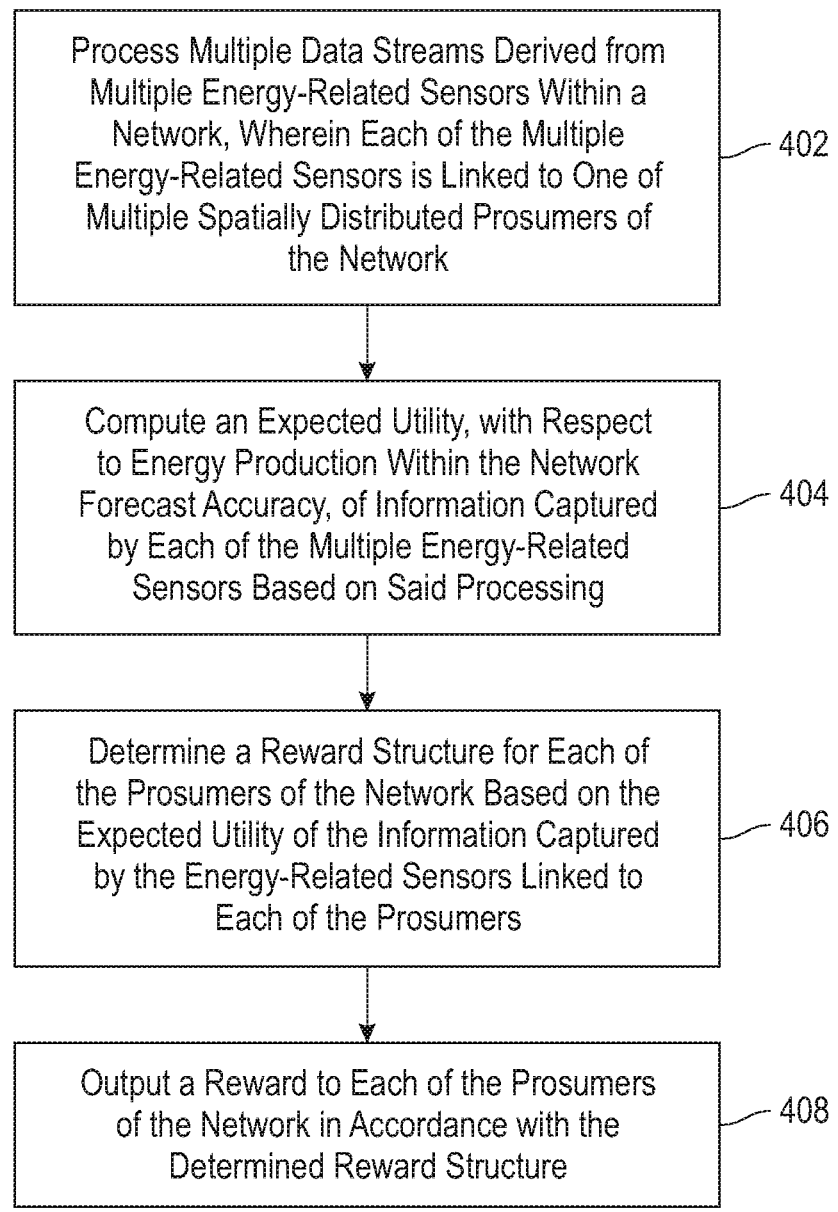
FIG. 4 is a flow diagram illustrating techniques according to an embodiment of the invention.

FIG. 4 is a flow diagram illustrating techniques according to an embodiment of the present invention. Step 402 includes processing multiple data streams derived from multiple energy-related sensors within a network, wherein each of the multiple energy-related sensors is linked to one of multiple spatially distributed prosumers of the network. The multiple energy-related sensors comprise multiple heterogeneous energy-related sensors. Such heterogeneous sensors can include sensors that sense different types of data (such as energy flow data and weather-related data), sensors that sense at different temporal resolutions, sensors that sense at different spatial resolutions, sensors that sense at different levels of accuracy, power sensors and/or environmental sensors.

Step 404 includes computing an expected utility, with respect to energy production within the network forecast accuracy, of information captured by each of the multiple energy-related sensors based on said processing. Step 406 includes determining a reward structure for each of the prosumers of the network based on the expected utility of the information captured by the energy-related sensors linked to each of the prosumers. Additionally, at least one embodiment of the invention can include controlling operation of the multiple energy-related sensors within the network based on the expected utility of the information captured by the energy-related sensors. Step 408 includes outputting a reward to each of the prosumers of the network in accordance with the determined reward structure. The reward can include, for example, a monetary payment.

The techniques depicted in FIG. 4 can also include determining a recommendation for installation of one or more additional energy-related sensors within the network based on (i) the location of the multiple energy-related sensors, (ii) the location of the prosumers within the network, and (iii) the expected utility of the information captured by the energy-related sensors. The recommendation can additionally include a geo-location for the installation of the one or more additional energy-related sensors, as well as identification of a type of sensor for the installation of the additional energy-related sensors. At least one embodiment of the invention can further include generating a cost-sharing scheme applicable to the prosumers of the network for the installation of the one or more additional energy-related sensors based on an expected derived value of the one or more additional energy-related sensors to the prosumers.

Also, an additional embodiment of the invention includes determining a recommendation for installation of one or more additional energy-related sensors within the network based on (i) the location of the multiple energy-related sensors, (ii) the location of the prosumers within the network, and (iii) the expected utility of the information captured by the energy-related sensors. Such an embodiment can also include generating a cost-sharing scheme applicable to the prosumers of the network for the installation of the one or more additional energy-related sensors based on an expected derived value of the one or more additional energy-related sensors to the prosumers, and outputting, to the prosumers of the network, (i) the recommendation and (ii) the cost-sharing scheme.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
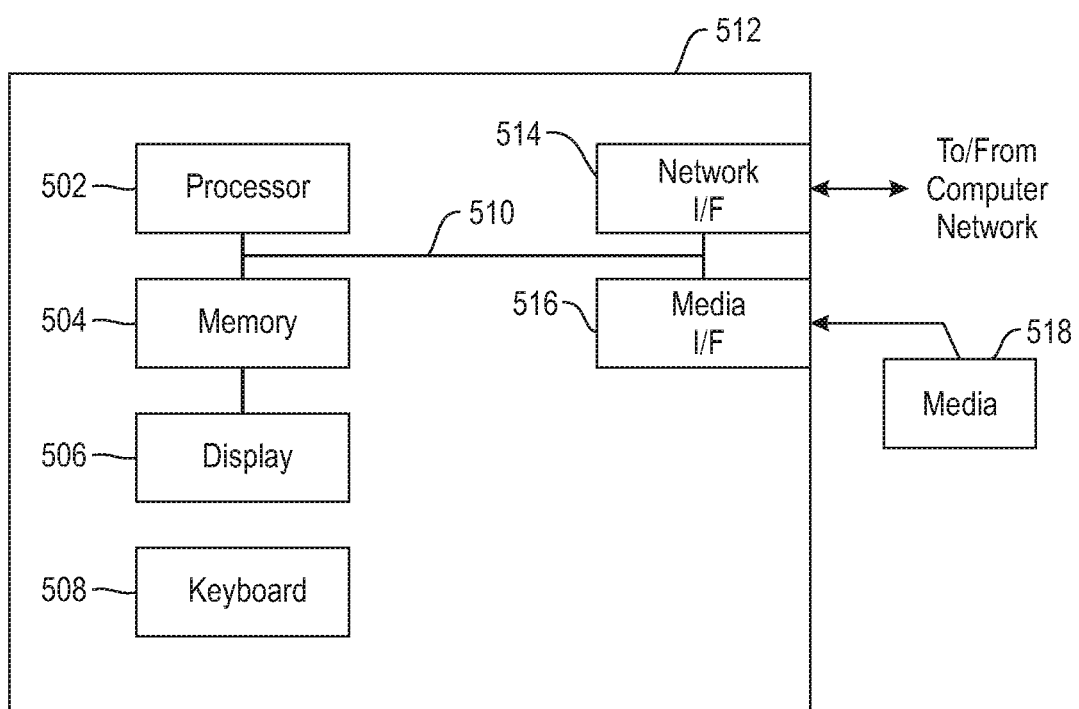
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, blending data from different data streams to forecast energy production of each prosumer, as well as analyzing expected utility of information gathered by the sensors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
processing multiple data streams derived from multiple respective energy-related sensors within a network, wherein each of the multiple energy-related sensors is linked to a respective one of multiple spatially distributed prosumers of the network;
computing an expected utility, with respect to forecast accuracy of energy production within the network, of information captured by each of the multiple energy-related sensors based on said processing;
determining a reward structure for each of the prosumers of the network based on the expected utility of the information captured by the energy-related sensors linked to each of the prosumers;

determining a recommendation for installation of one or more additional energy-related sensors within the network based on (i) the location of the multiple energy-related sensors, (ii) the location of the prosumers within the network, (iii) the expected utility of the information captured by the energy-related sensors, (iv) a set of feasible allocations of additional energy-related sensors to locations, (v) overall utility of each of the feasible allocations to all of the multiple spatially distributed prosumers, and (vi) a cost attributed to installation of each of the feasible allocations, wherein said recommendation comprises at least one allocation from the set of feasible allocations which maximizes the overall utility minus the cost, and wherein said recommendation comprises (a) a geo-location for the installation of the one or more additional energy-related sensors and (b) identification of a specific type of sensor for the installation of the one or more additional energy-related sensors; and outputting (i) a reward to each of the prosumers of the network in accordance with the determined reward structure and (ii) the recommendation to at least one of the prosumers of the network;

wherein the method is carried out by at least one computing device.

2. The computer-implemented method of claim 1, wherein the multiple energy-related sensors comprise multiple heterogeneous energy-related sensors.

3. The computer-implemented method of claim 2, wherein the multiple heterogeneous energy-related sensors comprise sensors that sense different types of data.

4. The computer-implemented method of claim 3, wherein the different types of data comprise energy flow data and weather-related data.

5. The computer-implemented method of claim 2, wherein the multiple heterogeneous energy-related sensors comprise sensors that sense at different temporal resolutions.

6. The computer-implemented method of claim 2, wherein the multiple heterogeneous energy-related sensors comprise sensors that sense at different spatial resolutions.

7. The computer-implemented method of claim 2; wherein the multiple heterogeneous energy-related sensors comprise sensors that sense at different levels of accuracy.

8. The computer-implemented method of claim 2, wherein the multiple heterogeneous energy-related sensors comprise power sensors and environmental sensors.

9. The computer-implemented method of claim 1, wherein the reward comprises a monetary payment.

10. The computer-implemented method of claim 1, comprising:

generating a cost-sharing scheme applicable to the prosumers of the network for the installation of the one or more additional energy-related sensors based on an expected derived value of the one or more additional energy-related sensors to the prosumers.

11. The computer-implemented method of claim 1, comprising:

controlling operation of the multiple energy-related sensors within the network based on the expected utility of the information captured by the energy-related sensors.

12. A computer program product comprising a computer readable storage medium having program instructions embodied therewith, the program instructions executable by a device to cause the device to:

process multiple data streams derived from multiple respective energy-related sensors within a network, wherein each of the multiple energy-related sensors is linked to a respective one of multiple spatially distributed prosumers of the network;

compute an expected utility, with respect to forecast accuracy of energy production within the network, of information captured by each of the multiple energy-related sensors based on said processing;

determine a reward structure for each of the prosumers of the network based on the expected utility of the information captured by the energy-related sensors linked to each of the prosumers;

determine a recommendation for installation of one or more additional energy-related sensors within the network based on (i) the location of the multiple energy-related sensors, (ii) the location of the prosumers within the network, (iii) the expected utility of the information captured by the energy-related sensors, (iv) a set of feasible allocations of additional energy-related sensors to locations, (v) overall utility of each of the feasible allocations to all of the multiple spatially distributed prosumers, and (vi) a cost attributed to installation of each of the feasible allocations, wherein said recommendation comprises at least one allocation from the set of feasible allocations which maximizes the overall utility minus the cost, and wherein said recommendation comprises (a) a geo-location for the installation of the one or more additional energy-related sensors and (b) identification of a specific type of sensor for the installation of the one or more additional energy-related sensors; and output (i) a reward to each of the prosumers of the network in accordance with the determined reward structure and (ii) the recommendation to at least one of the prosumers of the network.

13. A system comprising:

a memory; and at least one processor coupled to the memory and configured for:

processing multiple data streams derived from multiple respective energy-related sensors within a network, wherein each of the multiple energy-related sensors is linked to a respective one of multiple spatially distributed prosumers of the network;

computing an expected utility, with respect to forecast accuracy of energy production within the network, of information captured by each of the multiple energy-related sensors based on said processing;

determining a reward structure for each of the prosumers of the network based on the expected utility of the information captured by the energy-related sensors linked to each of the prosumers;

determine a recommendation for installation of one or more additional energy-related sensors within the network based on (i) the location of the multiple energy-related sensors, (ii) the location of the prosumers within the network, (iii) the expected utility of the information captured by the energy-related sensors, (iv) a set of feasible allocations of additional energy-related sensors to locations, (v) overall utility of each of the feasible allocations to all of the multiple spatially distributed prosumers, and (vi) a cost attributed to installation of each of the feasible allocations, wherein said recommendation comprises at least one allocation from the set of feasible allocations which maximizes the overall utility minus the cost, and wherein said recommendation comprises (a) a geo-location for the installation of the one or more additional energy-related sensors and (b) identification of a specific type of sensor for the installation of the one or more additional energy-related sensors; and output (i) a reward to each of the prosumers of the network in accordance with the determined reward structure and (ii) the recommendation to at least one of the prosumers of the network.

14. A computer-implemented method, comprising:

processing multiple data streams derived from multiple respective energy-related sensors within a network, wherein each of the multiple energy-related sensors is linked to a respective one of multiple spatially distributed prosumers of the network;

computing an expected utility, with respect to forecast accuracy of energy production within the network, of information captured by each of the multiple energy-related sensors based on said processing;

determining a recommendation for installation of one or more additional energy-related sensors within the network based on (i) the location of the multiple energy-related sensors, (ii) the location of the prosumers within the network, (iii) the expected utility of the information captured by the energy-related sensors, (iv) a set of feasible allocations of additional energy-related sensors to locations, (v) overall utility of each of the feasible allocations to all of the multiple spatially distributed prosumers, and (vi) a cost attributed to installation of each of the feasible allocations, wherein said recommendation comprises at least one allocation from the set of feasible allocations which maximizes the overall utility minus the cost, and wherein said recommendation comprises (a) a geo-location for the installation of the one or more additional energy-related sensors and (b) identification of a specific type of sensor for the installation of the one or more additional energy-related sensors;

generating a cost-sharing scheme applicable to the prosumers of the network for the installation of the one or more additional energy-related sensors based on an expected derived value of the one or more additional energy-related sensors to the prosumers; and outputting, to the prosumers of the network, (i) the recommendation and (ii) the cost-sharing scheme;

wherein the method is carried out by at least one computing device.

15. The computer-implemented method of claim 14, wherein the multiple energy-related sensors comprise multiple heterogeneous energy-related sensors.

* * * * *